Figure 1:
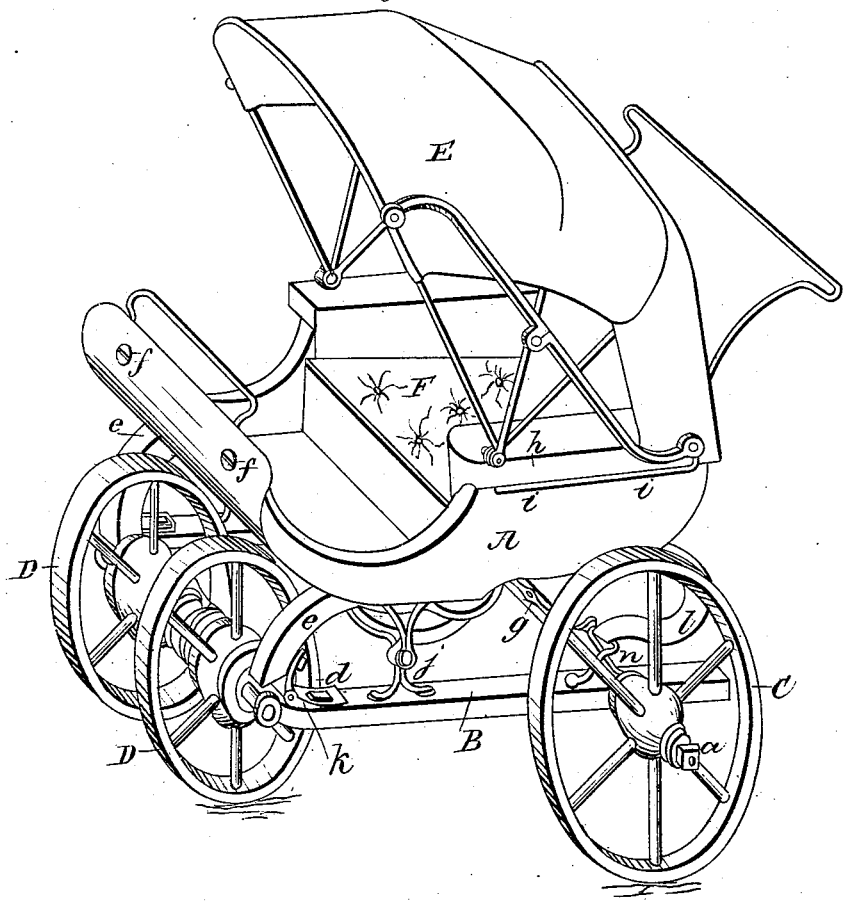

L. SHMETZER.

Child's Sleigh and Carriage.

No. 84,310.

2 Sheets—Sheet 1.

Patented Nov. 24, 1868.

Witnesses
P T Dodge
L. Hailer

Inventor.
Louis Shmetzer

L. SHMETZER.
Child's Sleigh and Carriage.
No. 84,310.
2 Sheets—Sheet 2.
Patented Nov. 24, 1868.
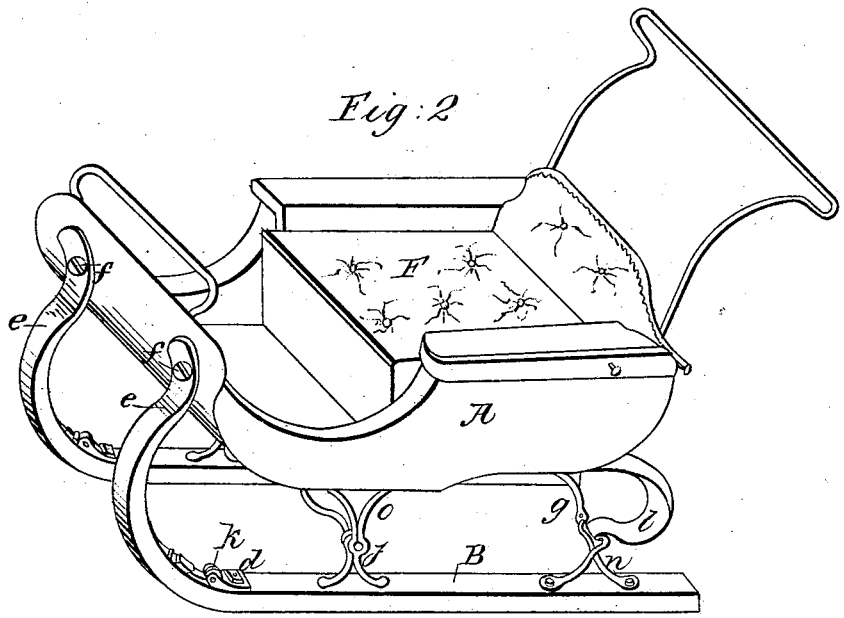
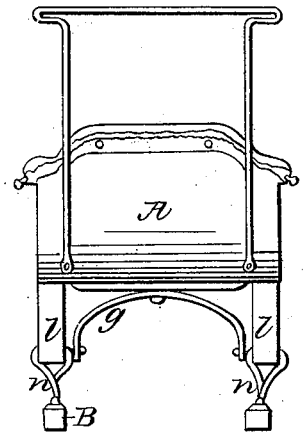
Witnesses.
P. T. Dodge
L. Hailer
Inventor
Louis Shmetzer

UNITED STATES PATENT OFFICE.

LOUIS SHMETZER, OF CHICAGO, ILLINOIS.

*Letters Patent No. 84,310, dated November 24, 1868.*

IMPROVED SLEIGH AND BABY-CARRIAGE.

The Schedule referred to in these Letters Patent and making part of the same.

*To all whom it may concern:*

Be it known that I, LOUIS SHMETZER, of Chicago, in the county of Cook, and State of Illinois, have invented certain new and useful Improvements in Combined Child's Carriage and Sled; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a novel combination of a child's carriage with a sled, in a manner admitting of an easy conversion into either, at will.

In the drawings—

Figure 1 is a perspective view of my vehicle, complete, when arranged for use as a carriage;

Figure 2, a perspective view of the same, transformed into a sled;

Figure 3, a rear-end elevation of the sled; and

Figure 4, a view of the seat detached.

The apparatus consists of a carriage-body, of the usual form, mounted on a frame, formed by two sled-runners, and which frame has attached to it two detachable axles, on which are secured wheels, supporting the whole, the wheels and axles being removed when the apparatus is used as a sled.

A represents the carriage-body, connected at its rear end to the sled-runners B by springs $l$, resting upon the ears or standards $n$, secured to the runners, and at the front end by standards $o$, hinged at $j$ to similar standards on the runners, thus allowing the rear end of the body to rise and fall as the springs $l$ yield.

The runners B are made in two sections, hinged together at $k$, the front parts $e$, when the apparatus is used as a carriage, being turned over back under the body, as shown in fig. 1, and held by suitable buttons or clips, but, when used as a sled, are turned out in front, and their ends secured to the front of the dash-board by screws $f$, all as clearly shown in fig. 2.

When used as a carriage, there are attached to the runners B two axles, bearing wheels C and D, as shown in fig. 1, the front axle being secured by collars upon it, which have ears upon them, that are secured by the bolts $d$, which pass through the front ends of the rear sections of the runners, and also hold one leaf of the hinges $k$. The rear axle is held by the ears or standards $n$, under which it passes.

To prevent any end-play of the rear axle, I pivot to the upper end of the standards $n$ a bow, $g$, extending across from one to the other, and which, when turned down, bears upon the axle at the middle, where it is secured to it by the bolt $b$, as shown in fig. 1, thus keeping the axle securely in place.

When the carriage is to be converted into a sled, one of the rear wheels is removed, by taking off the nut on the end of the axle, and the bolt $b$ is then removed, and the axle may be shoved out from the frame. The front axle is next detached, by removing the nuts $d$, which will release the collars that hold the axles, and, at the same time, the front sections of the runners, which are replaced and secured, but with their ends projecting up in front of the dash-board, to which they are then fastened by the screws $f$.

The top, E, is also detached by removing the screws $i$ and nut $h$, and unbuttoning the curtain around its lower edge. The bow $g$ is then turned up, and secured to the body, as shown in fig. 3, thus preventing the springs from operating, and bearing the strain that would otherwise be brought on them, and which, in a sled, (there often being sudden jolts and wrenches,) would be liable to break them. The said changes having been all made, the vehicle is transformed into a good, substantial sled, as shown in fig. 2.

For the purpose of adjusting the seat for children of different sizes, I make two instead of one set of grooves on the inside of the body, so that the seat may be made higher or lower, by placing it in one or the other set, the seat having an extension-piece, $m$, hinged to its lower front edge, as shown in fig. 4, which, when the seat is in the lower position, folds back under it, out of the way.

It is evident that this improvement may be applied to carriages having either two, three, or four wheels, and those drawn by a tongue in front, as well as those shoved by a handle from behind.

By this plan a vehicle is constructed that may be used at any season of the year, which may be adjusted for children of different sizes, and which answers the purpose of both a carriage and a sled, costing, at the same time, little or no more than an ordinary carriage.

Having thus fully described my apparatus,

What I claim as my invention, and desire to secure by Letters Patent, is—

The combination of the removable carriage-body A and wheels D C with the sled-runners B, when constructed and arranged as herein described, for the purpose of easy conversion into a child's carriage or sled, at will.

LOUIS SHMETZER.

Witnesses:
  WM. H. LOTZ,
  A. LIMBERG.